May 24, 1966  E. H. S. NIELSEN  3,252,590
APPARATUS FOR TILTING MOTOR CARS
Filed Jan. 7, 1964

INVENTOR.
ERIK HAUBERG SKRIVER NIELSEN
BY
ATTORNEYS.

May 24, 1966    E. H. S. NIELSEN    3,252,590
APPARATUS FOR TILTING MOTOR CARS
Filed Jan. 7, 1964    2 Sheets-Sheet 2

INVENTOR.
ERIK HAUBERG SKRIVER NIELSEN
BY
ATTORNEYS.

United States Patent Office 3,252,590
Patented May 24, 1966

3,252,590
APPARATUS FOR TILTING MOTOR CARS
Erik Hauberg Skriver Nielsen, 21 Kridthojvej,
Hojbjerg, Denmark
Filed Jan. 7, 1964, Ser. No. 336,200
Claims priority, application Denmark, Jan. 12, 1963,
150/63
6 Claims. (Cl. 214—1)

The present invention relates to an apparatus for tilting a motor car comprising a supporting member to be positioned under the car side to be lifted and a lifting mechanism therefore, especially for use in repair workshops for automobiles.

The invention has for its purpose to provide a new and useful apparatus or jack, by means of which the car may be brought to a tilted position in a safe and easy manner and maintained safety in the tilted position while the repair is carried out, and which is simple to manufacture and easy to handle.

According to the invention the supporting member is shaped as a lengthy member having means at one end for operatively engaging said lifting mechanism while the other end thereof is adapted to rest against the floor or equivalent supporting means. By this arrangement the tilting apparatus rests on the ground in two spaced points, lines or areas so that the stability of the tilted car will be much better than in case of a usual jack support. Furthermore, the lifting mechanism employed for lifting one end of the supporting member from the ground may be as simple as possible, since it may even be constituted by a jack of some well known type.

According to the invention the supporting member may have a central slot allowing it to be introduced under a coupling of front or back wheels standing on the ground. By this arrangement a sidewise tilting may be carried out simply by introducing one supporting member under each wheel pair and lifting the ends of these members to thereby bring the wheels along to the desired tilted position, in which the wheels at one side of the car are raised higher than those at the other side. Hereby the car is brought into a very stable and convenient tilted position, in which the tilting means do not obstruct the access to the underside of the car.

It is an important advantage that the tilting apparatus may be constructed as an easily movable unit to be used at any desired place.

Other features and advantages of the apparatus according to the invention will appear from the following description with reference to the drawings, in which.

Figure 1:
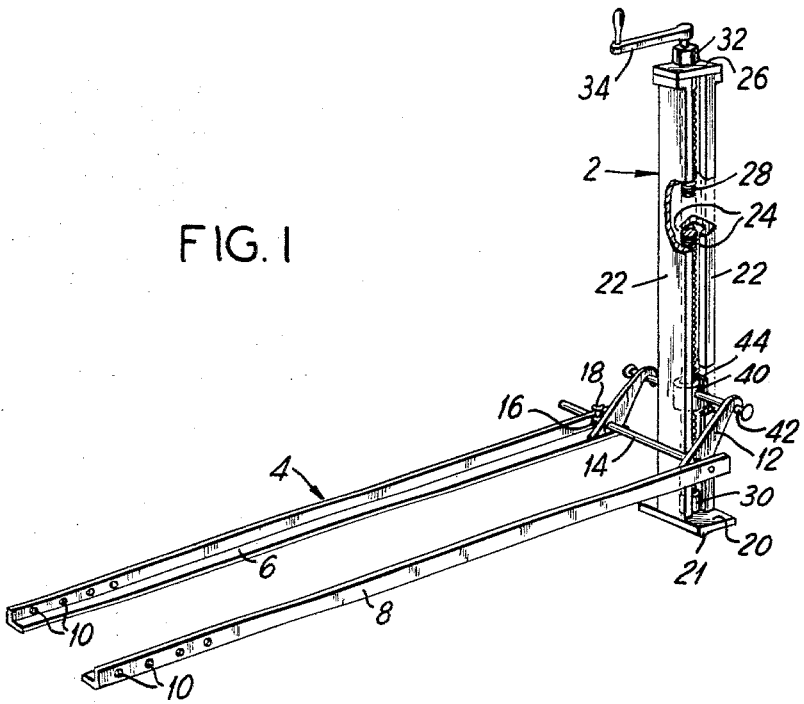
FIG. 1 is a perspective view of a tilting apparatus in a preferred embodiment of the invention.

The apparatus shown in FIG. 1 comprises a lifting unit generally designated with 2 and a supporting member 4. The latter consists of two parallelly spaced rails of angle iron 6 and 8, each having in one end a row of holes 10 in the upright flange of the iron and in the other end an upwardly inclined hook 12 rigidly secured to the rail ends. A cross bar 14 adjacent the hooks 12 is rigidly secured to the rail 8 and extends through aligned holes in the vertical flange of the rail 6 and the corresponding hook 12. Between these holes there is provided a bushing 16 having a finger screw 18 by means of which the upper end of the rail 6 may be fastened to the cross bar 14 in any desired distance from the rail 8.

The lifting apparatus 2 has a base plate 20, a couple of opposed U-rails 22 arranged so as to form side slots 24 between them, a top piece 26, a central screw-threaded spindle 28 rotatably mounted in a bottom bearing 30 and a top bearing 32 secured to the top plate. At the top the spindle is provided with a handle 34. A nut 40 is positioned on the spindle 28 and provided with carrying arms 42 projecting laterally through the side slots 24, and furthermore the nut 40 has a steering member 44 that fits in the U-form of the rails 22 so as to prevent the nut 40 from being rotated. It will be understood that the nut 40 with the carrying arms 42 will be raised or lowered when the handle 34 is turned. The base plate 20 has a transverse rib 21 below its front edge.

Figure 2:
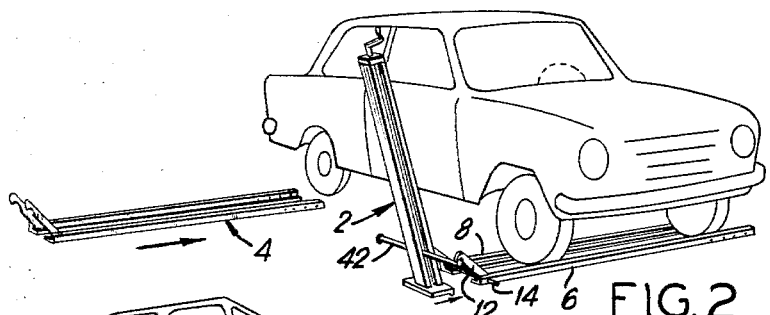
FIG. 2 is a perspective view illustrating the manner in which the apparatus of FIG. 1 is brought in its working position for tilting a motor car.

When a car is to be tilted sidewise supporting members 4 are pushed in under each pair of wheels as illustrated in FIG. 2, where the supporting member under the front wheels is shown in the preferred correct position having the outer end thereof positioned somewhat beyond the rear front wheel. In this position the two rails 6, 8 of each supporting member are pressed against the tyres and interlocked by means of the finger screw 18. A lifting apparatus 2 with the carrying arms 42 in their lowermost position is now placed with the arms 42 situated vertically below the cooperating notches of the hooks 12. The apparatus 2, standing on the rib 21 and the rear edge of the base plate 20, assumes an outwardly inclined position. Thereafter the arms 42 are raised somewhat by turning the handle 34 so that the arms will go in operative engagement with the hooks 12 to thereby stabilize the lifting apparatus 2 in its inclined start position.

Figure 3:
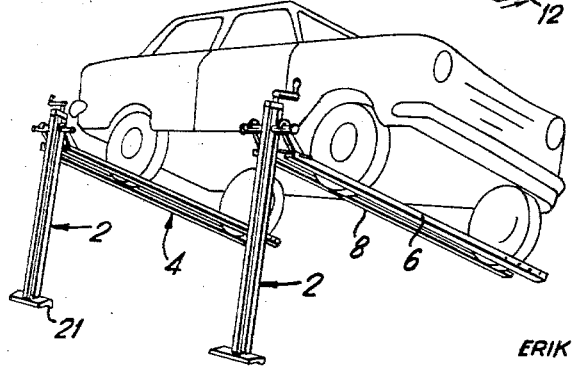
FIG. 3 is a view corresponding to FIG. 2 showing the apparatus in the tilted position of the car.

After having provided the pair of back wheels with a similar arrangement the operator may now tilt the car to the position shown in FIG. 3 by alternately turning the two handles 34 a few turns until the desired degree of tilting is obtained, or two operators may turn the handles continuously. The entire operations take few minutes only.

The use of the longish supporting members 4 placed under the wheels is extremely advantageous since for example a usual jack may be placed on the supporting member behind a wheel with the purpose for lifting the wheel suspension to thereby enable the wheel to the taken off, so that almost all kinds of undercar repairs may be carried out in a most convenient and stable position of the car.

If the wheels or rails 6, 8 are wet the car may slide down on the tilted rails and for preventing this a cross pin (not shown) can be mounted across the outer end of the supporting member 4 simply by being inserted through the appropriate two of the holes 10. Hereafter the rear wheel will rest against the cross pin with its lower part.

It is a surprising fact that the free ends of the tails 6, 8 need no interconnection whatsoever for preventing a spreading thereof by the pressure of the wheels; practice has shown that the free ends are pressed so firmly against the floor that no such spreading takes place.

Figure 4:
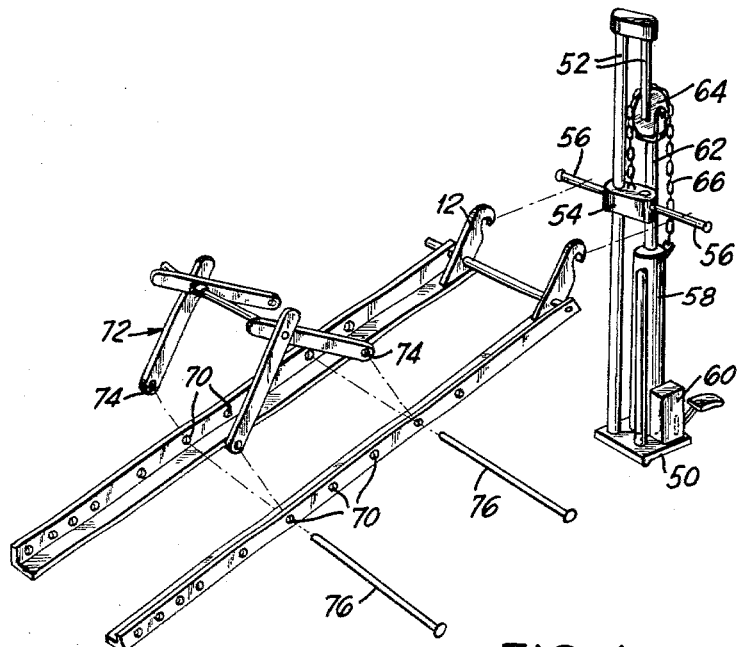
FIG. 4 is a perspective exploded view of another embodiment of the apparatus according to the invention, additionally adapted for endwise tilting of a car, and FIG. 5 a view corresponding to FIG. 3 but showing the car in a lengthwise tilted position.

In FIG. 4 the lifting apparatus is shown in a modified embodiment. The base plate 50 is provided with two upright rods 52 having a lifting block 54 slidably mounted thereon. The block 54 is provided with carrying arms 56. A hydraulic cylinder 58 and a foot pump 60 therefor is mounted on the base plate 50 with the cylinder behind the rods 52. The cylinder has a piston rod 62 carrying a chain wheel 64 at the top thereof. The ends of the chain 66 passing over the chain wheel 64 are secured to the cylinder 58 and the block 54 respectively. The device is so dimensioned that the block 54 assumes its bottom position when the cylinder is unactivated and its top position when the piston rod has been pumped to its own top position. This lifting apparatus just exemplifies another type of lifting unit which may be used with the supporting member according to the invention.

The supporting member shown in FIG. 4 has the same configuration as that previously described, but in the middle portion of the vertical flanges there is provided a number of aligned holes 70. A scissors-like trestle 72 having holes 74 in the lower ends thereof is adapted to be mounted in any desired position on the supporting member by means of cross pins 76 through corresponding hole pairs 70, 74.

Figure 5:
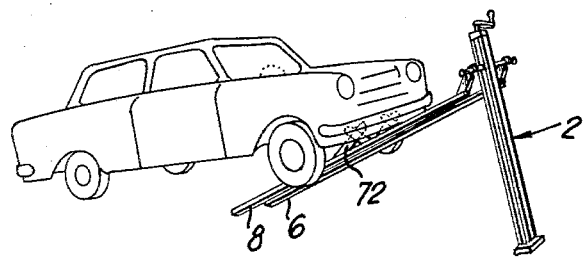

The trestle 72 constitutes a convenient supporting member for cooperation with car parts other than the wheels. As an example the assembly is shown in FIG. 5 lifting the front end of a car, the trestle supporting parts of the chassis frame. Also in this case the car will assume a very stable position. If desired, a wooden block or another suitable body may be interposed between the car and the top of the trestle or even directly between the supporting rails and the car.

The invention is not limited to the embodiments shown in the drawings. The construction of the lifting or hoisting mechanism is of less importance as long as it is just able to lift the end of the longish supporting member. The supporting member need not be rectilinear, and the rails may be substituted by a plate or by rod or tube members. If desired, the lower ends of the supporting member and the lifting apparatus may be swingably hinged to the ends of a bottom frame arranged therebetween for further improving the stability especially in case of more soft ground.

The term "the end" of the supporting member refers to the point of application of the lifting mechanism, respectively the point of engagement with the floor; the supporting member may well have parts beyond these points.

I claim:

1. An apparatus for tilting a motor car standing on a base surface, comprising a pair of parallelly spaced beams to be positioned transversely under the car to be tilted immediately at each side of the contact area between a car wheel and the base surface, and a lifting mechanism having a raisable lifting member, said beams having means at one end for operatively engaging said lifting member and means at the other end for resting against said base surface, said beams being provided with adjustable cross connection means adjacent said lifting member engaging ends to interconnect said beams and to provide for adjustability of the spacing between said beams.

2. An apparatus for tilting a motor car standing on a base surface, comprising a pair of parallelly spaced beams of a length longer than the width of the motor car to be tilted, said beams being adapted to be positioned transversely under the car immediately at each side of the contact areas between a pair of car wheels and the base surface, and a lifting mechanism having a raisable lifting member, said beams having means at one end for operatively engaging said lifting member and means at the other end for resting against said base surface, said beams being provided with adjustable cross connection means adjacent said lifting member engaging ends to interconnect said beams and to provide for adjustability of the spacing between said beams.

3. An apparatus as claimed in claim 1, said beams further being provided with means for releasably holding a cross bar therebetween in a position adjacent the base surface engaging end of said beams.

4. An apparatus for tilting a motor car standing on a base surface, comprising a pair of parallelly spaced beams to be positioned transversely under the car to be tilted immediately at each side of the contact area between a car wheel and the base surface, and a lifting mechanism having a raisable lifting member, said beams having coupling means at one end for detachably hinging these beam ends to said lifting member and means at the other end for resting against the said base surface, said beams being provided with adjustable cross connection means adjacent said lifting member engaging ends to interconnect said beams and to provide for adjustability of the spacing between said beams.

5. An apparatus for tilting a motor car standing on a base surface, comprising a pair of parallelly spaced beams to be positioned transversely under the car to be tilted immediately at each side of the contact area between a car wheel and the base surface, and a lifting mechanism having a raisable lifting member provided with protruding carrying arms, said beams each having hook means at one end for operatively engaging said carrying arms of said lifting member and means at the other end for resting against said base surface, said beams being provided with adjustable cross connection means adjacent said lifting member engaging ends to interconnect said beams and to provide for adjustability of the spacing between said beams.

6. An apparatus for tilting a motor car standing on a base surface, comprising a pair of parallelly spaced beams to be positioned transversely under the car to be tilted immediately at each side of the contact area between a car wheel and the base surface, and a lifting mechanism having a ground engaging surface and a lifting member operable to be raised from a lowermost to a topmost position on said lifting mechanism relatively to said ground engaging surface, said beams having coupling means at one end operable to detachably hinge said beam ends to said lifting member and means at the other end for resting against said base surface, said coupling means assuming a fixed height position above said base surface when said beams rest freely thereon, said lowermost position of said lifting member being situated in height above said ground engaging surface which is at most equal to the height of said coupling means of said beams in said fixed height position thereof, said beams being provided with adjustable cross connection means adjacent said lifting member engaging ends to interconnect said beams and to provide for adjustability of the spacing between said beams.

References Cited by the Examiner

UNITED STATES PATENTS

| 1,003,735 | 9/1911 | Hackney. | |
|---|---|---|---|
| 2,613,084 | 10/1952 | Burch | 214—332 |
| 3,014,698 | 12/1961 | Arnes | 254—124 |

FOREIGN PATENTS

| 661,558 | 11/1951 | Great Britain. |
| 537,181 | 12/1955 | Italy. |

MARVIN A. CHAMPION, *Primary Examiner.*